United States Patent Office

3,442,877
Patented May 6, 1969

3,442,877
TWO-STAGE HYDROGENATION PROCESS
Karsten Herbert Moritz, Lloyd Albert Pine, and Henry George Ellert, Baton Rouge, La., assignors to Esso Research and Engineering Company, a corporation of Delaware
No Drawing. Filed July 20, 1965, Ser. No. 473,487
Int. Cl. C08f *15/42, 27/25*
U.S. Cl. 260—82     3 Claims

ABSTRACT OF THE DISCLOSURE

Petroleum resins are hydrogenated in two stages, the first stage being under relatively mild conditions to hydrogenate color bodies, and the second stage under more stringent conditions. With this process, color is improved while softening point remains satisfactory.

---

This invention relates to a method for the hydrogenation of resins from steam-cracked hydrocarbon fractions and more particularly relates to a method for producing a color stable product without degrading the softening point of the hydrogenated resin.

It is known to prepare resins from steam-cracked petroleum fractions by Friedel-Crafts polymerization at low temperatures and to hydrogenate the resulting product over a hydrogenation catalyst in the presence of a hydrocarbon solvent. The hydrogenation converts an otherwise highly colored and thus, for many uses, an undesirable product, into a low-colored commercially attractive product. However, with the mild hydrogenation conditions sufficient to remove the color, the hydrogenated product is color unstable because the reactive sites causing the formation of color bodies have not been removed. On ther other hand, if the hydrogenation is carried out under conditions sufficiently severe to remove these sites, then the resin is degraded to an unacceptably low softening point.

In accordance with the present invention it has been discovered that the above difficulties can be avoided and a colorless and color stable product with good softening point obtained by carrying out the hydrogenation reaction in two stages, the first being carried out under mild conditions and the second under more severe conditions.

The base resin which is to be hydrogenated in accordance with the present invention is prepared from certain unsaturated petroleum refinery streams which contains various mixtures of acylic and cyclic olefins and diolefins by contact with a Friedel-Crafts type catalyst under relatively low temperatures, e.g. −150 to +200° F. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table.

TABLE I.—STEAM CRACKED NAPTHA FRACTION BOILING BETWEEN 10° AND 230° C.

| Component | Approximate Boiling Range, °C. | Specific Example, Vol. Percent | General Range (15–70° C.) Vol. Percent |
|---|---|---|---|
| $C_5$ Fraction | 10 to 65 | 31 | 10 to 40 |
| $C_6$–$C_8$ Fraction | 65 to 150 | 64 | 30 to 70 |
| $C_9$–$C_{12}$ Fraction | 150 to 230 | 5 | 0 to 25 |

Although the actual content of various chemical classes of hydrocarbons present may vary somewhat according to the type of crude oil from which the gas-oil fraction is being cracked and according to the steam cracking conditions and fractionating conditions; nevertheless, in general, a desirable, essential debutanized, steamcracked naphtha fraction boiling between 50 and 450° F. will have approximately by the following range in composition:

|   | Percent by weight |
|---|---|
| Aromatic hydrocarbons | 10–50 |
| Olefins | 30–70 |
| Unreactive paraffins | 0–5 |

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of mono-olefins and about 0 to 5 weight percent unreactive paraffins.

Any of the above fractions are converted into resin by polymerization in the presence of a Friedel-Crafts catalyst, such as $AlCl_3$, $BF_3$, $SnCl_4$, $TiCl_4$, $AlBr_3$, etc. at a temperature of about −150° F. to +200° F., preferably 70 to 130° F. The resin thus produced becomes the feed to the second step of the process. In this step the resin is hydrogenated in the presence of a catalyst and a solvent.

Suitable solvents for use in the hydrogenation step include n-hexane and its various isomers, n-heptane, and the like.

Suitable hydrogenation catalysts include metals of Groups VI and VIII of the Periodic Table, e.g. nickel, palladium, platinum, nickel sulfides, copper chromite, cobalt molybdate, etc. which may be supported on light porous or other granular particles such as alumina, pumice, clay, charcoal, etc.

The hydrogenation is effected in a continuous process under a pressure of about 100 to 5000 p.s.i.g., preferably about 500 to 3000 p.s.i.g., at temperatures of 100 to 750° F., preferably about 300 to 500° F., under a hydrogen flow rate of about 100 to 200° standard cubic feet per barrel of feed with a liquid feed rate of 0.1 to 5, preferably 0.3 to 2 v./v./hr., i.e. volumes of liquid feed per volume of catalyst per hour.

In accordance with this invention a low color resin having good color stability and improved softening point is obtained by carrying out the hydrogenation in two stages with a temperature differential of 25 to 100° F. between the stages. The first stage is carried out at 350–450° F. and the second stage at 400–500° F.

The advantages and details of the invention will be better understood from the following examples.

Example 1

The feed or raw material which was subjected to polymerization was made by steam-cracking a gas oil petroleum fraction derived from a paraffinic type crude, the cracking being carried out at a temperature of about 1300 to 1450° F. and pressure of 5 to 20 p.s.i.g. in the presence of about 70 to 80 mol. precent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then subjected to Friedel-Crafts polymerization at a temperature of 90 to 120° F. for a residence time of one hour with 1 wt. percent $AlCl_3$ catalyst based on feed. The polymerization was terminated by the addition of a 2:1 mixture, by volume, of water to isopropyl alcohol. Inorganic halides resulting from catalyst decomposition were then removed from the resin solution by washing successively with warm water. The resulting resin solution was stripped under 3–5 mm. Hg to a maximum bottoms temperature of 520° F. to recover the resin product having a softening point of 110° C.

Example 2

Two weights of the petroleum resin of Example 1 (as a 20% solution in heptane) and one weight of ⅛″ pilled Harshaw nickel catalyst on kieselguhr were reacted in a rocking bomb for four hours at 400° F. under 1000 p.s.i.g. hydrogen pressure. The resulting stripped resin had a softening point of 108° C. When this product was mixed with one-half weight of fresh catalyst and again hydrogenated for four more hours at 500° F. and 1000 p.s.i.g. hydrogen pressure, the resulting resin had a softening point of 101° C. When the original unhydrogenated resin of Example 1 was hydrogenated for four hours under 1000 p.s.i.g. at 500° C. using only one-half weight of catalyst, the stripped resin had a softening point of 96° C., thus showing that the more stringent conditions when used without a conditioning pretreatment at a lower temperature resulted in a resin having a badly degraded softening point.

Example 3

The resin of Example 1 was hydrogenated at 1000 p.s.i.g. hydrogen pressure in the presence of ⅛″ pilled Harshaw nickel on kieselguhr catalyst. The process was carried out in one step at 400° F. and 500° F. for four hours and in two steps of four hours each with the first step at 400° F. and the second at 500° F. The color stability of each resin was then tested by heating the resin to 125° C. for fifteen hours in air. The following results were obtained.

| | I<br>Low Severity<br>One Step | II<br>High Severity<br>One Step | III<br>Two<br>Step [1] |
|---|---|---|---|
| Hydrogenation Conditions: | | | |
| Temp., °F | 400 | 500 | |
| Holding time, hrs | 4 | 4 | |
| Product Color, Gardener [2] | <1 | <1 | <1 |
| Softening point | 110 | 94 | 102 |
| Color before heat treatment | <1 | <1 | <1 |
| Color after heat treatment | 15 | 8 | 3 |

[1] Four hours at 400° F. followed by four hours at 500° F.
[2] Measured as a 50 wt. percent solution of resin in toluene.

The above data show that the two step hydrogenation procedure yields resin product with improved softening point and color stability.

The advantages of the present invention having thus been fully set forth and specific examples of the same given, what is claimed as new and useful and desired to be secured by Letters Patent is:

1. In the process for hydrogenating resins prepared by Friedel-Crafts polymerization of steam cracked petroleum fractions in order to improve the color of the resins, the improvement which comprises:
   (a) hydrogenating in a first stage at a temperature of 350°–450° F., followed by
   (b) hydrogenating in a second stage at a more severe temperature of 400°–500° F., the temperature differential between the two stages being between 25° and 100° F.

2. The process of claim 1 wherein the temperature of the first stage is 400° F., and the temperature of the second stage is 500° F.

3. The process of claim 2 wherein hydrogenation was effected for four hours in each stage.

References Cited

UNITED STATES PATENTS

| 2,544,555 | 3/1951 | Jones et al. | 260—82 |
| 2,824,860 | 2/1958 | Aldridge et al. | 260—82 |
| 2,911,395 | 11/1959 | Small | 260—82 |
| 3,040,009 | 6/1962 | Wadsworth et al. | 260—82 |

JOSEPH L. SCHOFER, *Primary Examiner.*

J. C. HAIGHT, *Assistant Examiner.*